March 1, 1966 J. H. WESSELS 3,238,471

MULTIVIBRATOR CIRCUIT FOR PRODUCING FREQUENCY MODULATED OSCILLATIONS

Filed Feb. 5, 1963 2 Sheets-Sheet 1

INVENTOR
JOHANNES H. WESSELS
BY Mark R. Jufan

March 1, 1966 J. H. WESSELS 3,238,471

MULTIVIBRATOR CIRCUIT FOR PRODUCING FREQUENCY MODULATED OSCILLATIONS

Filed Feb. 5, 1963 2 Sheets-Sheet 2

INVENTOR.

JOHANNES H. WESSELS

BY

Frank R. Jifari

AGENT

United States Patent Office 3,238,471
Patented Mar. 1, 1966

3,238,471

MULTIVIBRATOR CIRCUIT FOR PRODUCING FREQUENCY MODULATED OSCILLATIONS

Johannes Hendrik Wessels, Emmasingel, Eindhoven, Netherlands, assignor to North American Philips Company, Inc., New York, N.Y., a corporation of Delaware Filed Feb. 5, 1963, Ser. No. 256,383
Claims priority, application Netherlands, Feb. 8, 1962, 274,582
12 Claims. (Cl. 332—14)

The invention relates to a multivibrator circuit for producing frequency-modulated oscillations. The circuit comprises two amplifiers having output electrodes cross-coupled to their control electrodes through capacitors. The modulating signals are applied to these control electrodes. Such an arrangement may be used for recording stereophonic signals or television signals on a magnetic tape. For such use it is of importance that the distortion of the modulation characteristic is a minimum.

According to the invention the modulating signal is provided by a source which has a high internal impedance. The current of the source is passed through two rectifiers which are connected to the capacitors and are alternately rendered conductive by the multivibrator voltage. This current determines the charging current of these capacitors.

It has already been proposed to limit the oscillations produced at the input electrodes of the amplifying elements with the aid of diodes. In such an arrangement, however, the modulating current does not flow to the capacitors through these diodes.

In order that the invention may be readily understood embodiments thereof will now be described, by way of example, with reference to the accompanying diagrammatic drawings, in which.

Figure 1:
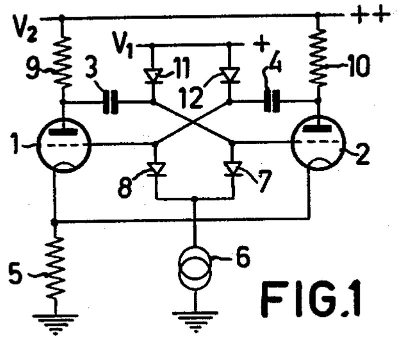
FIGURE 1 is a schematic diagram of a circuit according to the invention.

The arrangement shown in FIGURE 1 comprises a multivibrator of a known type including two amplifier tubes 1 and 2, the anodes of which are cross-coupled to the grids through capacitors 3 and 4 respectively. Thus, the anode of the tube 1 is coupled to the grid of the tube 2 through the capacitor 3 and the anode of the tube 2 is coupled to the grid of the tube 1 through the capacitor 4. The cathodes of the tubes 1 and 2 are connected to ground through a common resistor 5 which improves the symmetry of the square-wave voltages produced in the anode circuits of the tubes 1 and 2.

According to the invention the modulation signals are supplied by a source 6 having a high internal impedance. The current from this source is passed through rectifiers 7 and 8 connected to the capacitors 3 and 4 respectively. The resulting circuit operates as follows:

It is assumed that initially the tube 2 has just started to conduct and the tube 1 has just been cut off. The charging current of the capacitor 3 now flows through the anode resistor 9 of the tube 1 and through the source 6 and the rectifier 7, which has been rendered conductive by this current, to the said capacitor. As a result the voltage $V_{g2}$ at the grid of the tube 2, after an initial surge due to the fact that the current through the tube 1 is cut off and hence the voltage drop across the resistor 9 is removed, decreases according to a sawtooth wave form with the time $t$ FIGURE 2($a$).

Owing to the presence of the cathode resistor 5 the voltage $V_K$ at the cathodes of the two tubes accordingly decreases so as to provide a sawtooth wave form. This decrease of the voltage continues until the cathode voltage has fallen to a value at which the tube 1 is rendered conductive and the tube 2 is rendered non-conductive again by the trigger effect. The grid voltage of the tube 1 may be fixed during the non-conductive period thereof with the aid of a diode 12 at a value determined by a voltage $V_1$ which is lower than the anode supply voltage $V_2$. This diode 12 and/or the corresponding diode 11 connected in the grid circuit of the tube 1 may, however, in principle be replaced by a resistor or resistors, although this adversely affects the operation of the arrangement. If, now, the source of current 6 is modulated, the slopes of the sawtooth voltages and hence their frequencies will be altered.

Figure 2:
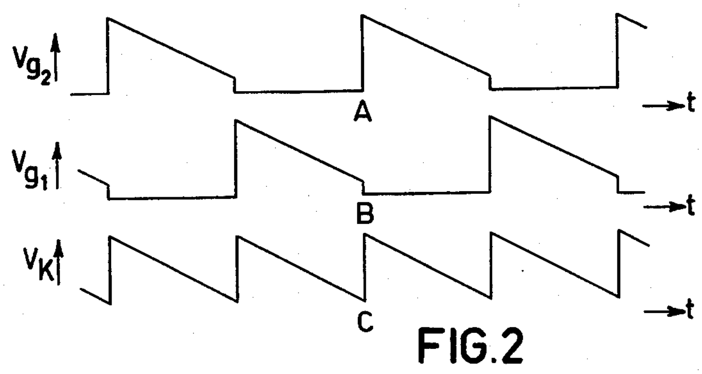
FIGURE 2 shows voltage-time diagrams for the circuit shown in FIGURE 1.

Since the tube 1 is suddenly rendered conductive and the tube 2 rendered non-conductive, the control grid voltage $V_{g1}$ of the first mentioned tube is increased, as is shown in FIGURE 2($b$). Due to the provision of the rectifiers 7 and 8 in accordance with the invention, current from the source 6 now automatically passes through the rectifier 8 and hence determines the charging current of the capacitor 4. The high internal impedance of the source 6, which may be an n-p-n transistor, ensures satisfactory linearity of the produced saw-tooth voltages and hence of the modulation characteristic which shows the frequency of the sawtooth oscillations as a function of the modulating current of the source 6. The voltage at the cathodes of the tubes is shown in FIG. 2($c$), and thus if a sawtooth waveform voltage output is desired it may be derived from the cathode circuit of the tubes.

When tube 2 starts to conduct, its plate voltage drops rapidly. Consequenly, due to coupling capacitor 4, the voltage at the grid of $V_1$ drops rapidly until it reaches the voltage $V_1$. When the grid voltage of tube 1 has reached the voltage $V_1$, the diode 12 starts to conduct, so that the grid of tube 1 is clamped at the voltage $V_1$ during the conduction period of tube 2. During this period the capacitor 4 is discharging by way of diode 12, cathode resistor 5 and tube 2. Due to the flow of charging current for capacitor 3 through the high internal impedance source 6, the voltage between the terminals of source 6 is greater than the voltage $V_1$. This is apparent from the curve of FIG. 2($a$), wherein the voltage at the grid of tube 2 during the conduction period of this tube is always more positive than the clamped value of $V_1$ during the cutoff period. Thus, when tube 2 conducts, the voltage at the cathode of rectifier 8 is positive with respect to its anode, and rectifier 8 is nonconductive. Similarly, when tube 1 conducts current, the voltage at the grid of tube 2 is clamped at $V_1$, and rectifier 8 is nonconductive.

A similar effect is obtained if the resistor 5 and the rectifiers 11 and 12 are omitted and the rectifiers 7 and 8 are reversed and connected to the collector of a p-n-p-transistor which acts as the source 6, the emitter of the transistor being connected to the positive terminal of the supply source.

Figure 3:
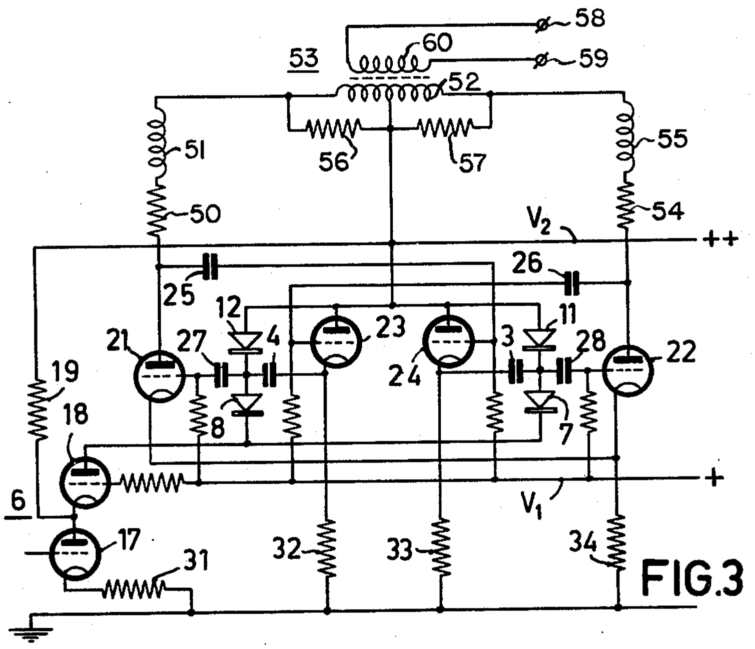
FIGURE 3 is a schematic diagram of a modification of the circuit of FIG. 1.

In the embodiment shown in FIGURE 3 the current source 6 is comprised of two cascade-connected discharge tubes 17 and 18. The anode supply voltage of the tube 18, the cathode of which is connected through a large resistor 19 to the supply voltage $V_2$, is derived from this voltage $V_2$ through the rectifiers 11 and 7 or 12 and 8, the rectifiers 7 and 8 being again alternately rendered conductive in accordance with the produced sawtooth oscillations. The tubes 1 and 2 of the arrangement shown in FIGURE 1 are replaced by two-stage amplifiers 21–23 and 22–24, the anodes of the tubes 21 and 22 being cross-coupled through blocking capacitors 25 and 26 to the control grids of the tubes 24 and 23 respectively. The cathodes of the latter tubes are connected through the charging capacitors 3 and 4 described with reference to FIGURE 1 to the junctions of the diodes 7 and 11 and 8 and 12 respectively and these junctions are coupled through blocking capacitors 27 and 28 to the grids of the tubes 21 and 22 respectively.

The anode of tube 21 is connected to source $V_2$ by way of load impedance means comprising series connected resistor 50, inductor 51, and one-half of the primary winding 52 of transformer 53. Similarly, the anode of tube 22 is connected to source $V_2$ by way of impedance means comprising series connected resistor 54, inductor 55, and the other half of primary winding 52. The center tap of the winding 52 is connected to $V_2$. Resistors 56 and 57 may be connected in parallel with the halves of the primary winding. Output signals from the circuit of FIG. 3 may be obtained from terminals 58 and 59 connected to the secondary winding 60 of transformer 53. It will be obvious, however, that the invention is not limited to this specific form of output circuit.

In a practical embodiment of the invention the voltages $V_1$ and $V_2$ were 100 volts and 250 volts respectively. The tubes were of the type E 88 CC and the diodes of the type OA 70. The gridleak resistors each had a value of 100K ohms, the capacitors 3 and 4 were 22 pf. each and the capacitors 25, 26, 27 and 28 were 3300 pf. each. The value of the resistor 19 was 39K ohms and that of the cathode-resistors 31–34 was 1.8K ohms, 8.2K ohms, 8.2K ohms and 3.9K ohms, respectively. By means of the control voltage applied to the grid of the tube 17 the frequency of the produced oscillations could be varied between 1 and 15 mc./s.

Figure 4:
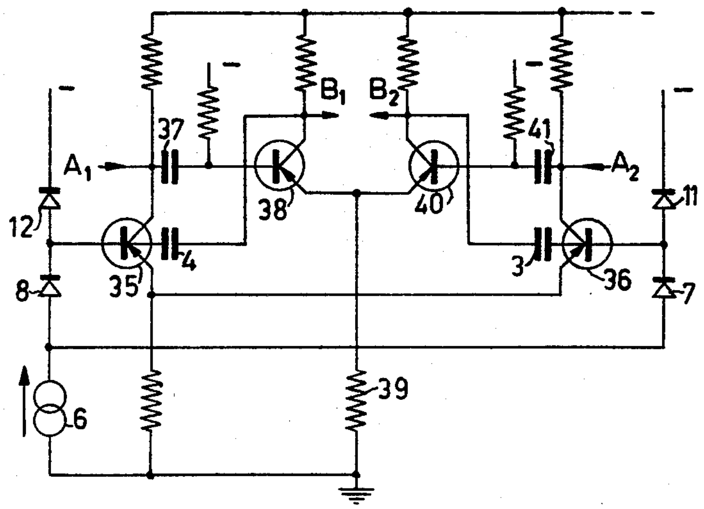
FIGURE 4 is a schematic diagram of another embodiment of the invention.

FIG. 4 shows a transistor circuit in accordance with the invention.

Transistors 35 and 36 correspond to tubes 1 and 2 of FIG. 1. The collector of the transistor 35 is coupled, through a blocking capacitor 37, a transistor 38, an emitter resistor 39 of the latter transistor and a transistor 40, to the discharge capacitor 3, which is connected to the base of the transistor 36. Similarly, the output electrode of the transistor 36 is coupled, through a blocking capacitor 41, the transistor 40, the emitter resistor 39 and the transistor 38, to the discharge capacitor 4, which is connected to the input electrode of the transistor 35.

The oscillator shown in FIG. 4 can be synchronized with the aid of a synchronizing signal applied between the collectors (A1, A2) of the transistors 35 and 36; when this synchronizing signal fails to appear or at least becomes too small to synchronize the oscillator, the oscillator commences to oscillate at the frequency which is determined by the source of current 6.

Such an oscillator may, for example, be used to fill up voids which may occur in a frequency-modulated carrier wave read out from a magnetic record carrier, with a suitable frequency which may be adjusted by the current source 6. The signal containing the voids which is read from the magnetic record carrier is supplied to the terminals A1 and A2. The corrected signal is taken from the collectors of the transistors 38 and 40 at output terminals B1 and B2.

What is claimed is:

1. A variable frequency multivibrator circuit comprising first and second amplifier devices each having an input, common and output electrode, a source of operating potential having first and second terminals, common direct current conducting impedance means connecting said common electrodes to said first terminal, separate impedance means connecting said output electrodes to said second terminal, first and second capacitors, means coupling one electrode of said first and second capacitors to the output electrode of said first and second devices respectively, means coupling the other electrode of said first and second capacitors to the input electrodes of said second and first devices respectively, a high internal impedance source of modulating signals, first and second rectifier means, means connecting said modulating signal source between said first terminal and like electrodes of said first and second rectifier means, and means connecting the remaining electrodes of said first and second rectifier means to said other electrodes of said first and second capacitors respectively, said rectifier means being poled to form a charging current path for said first capacitor by way of said first rectifier means and said modulating signal source, and a charging current path for said second capacitor by way of said second rectifier means and said modulating signal source, whereby said rectifier means are rendered alternatively conductive by voltages of said multivibrator circuit.

2. The multivibrator circuit of claim 1 comprising third and fourth rectifier means, means connecting said remaining electrode of said first rectifier means to the unlike electrode of said third rectifier means, means connecting said remaining electrode of said second rectifier means to the unlike electrode of said fourth rectifier means, a third terminal on said source of operating potential having a potential intermediate the potentials of said first and second terminals, and means connecting the remaining electrodes of said third and fourth rectifier means to said third terminal.

3. The multivibrator circuit of claim 1 wherein said source of modulating signals comprises a third amplifier device having an output electrode connected to said like electrodes of said first and second rectifier means, a common electrode connected to a point of reference potential, and an input electrode, and means applying said modulating signals to said last-mentioned input electrode, whereby substantially all of the operating current of said third device flows through said first and second rectifier means.

4. The multivibrator circuit of claim 1 wherein said means coupling one electrode of said first and second capacitors to said output electrodes of said first and second devices comprises amplifier device means.

5. A variable frequency multivibrator circuit comprising first and second electron discharge devices each having cathode, control grid and anode electrodes, a source of operating potential having positive and negative terminals, separate impedance means connected between said anode terminals and said positive terminal, common direct current conducting impedance means connected between said cathode electrodes and said negative terminal, first and second capacitor means for coupling the anodes of said first and second devices respectively to the control grid of said second and first devices respectively, a high internal impedance source of modulating signals having first and second terminals, means connecting said first terminal to said negative terminal, first and second rectifier means having their respective cathodes connected to said second terminal, and means connecting the anodes of said first and second rectifier means to the control grid electrodes of said first and second devices respectively, whereby said first and second rectifier means are alternately conductive so that said first and second capacitor means are alternately charged by way of said modulating circuit.

6. The multivibrator circuit of claim 5 comprising third and fourth rectifier means having their cathodes connected to the anodes of said first and second rectifier means respectively, said source of operating potential having a third terminal less positive than said positive terminal, and means connecting said third terminal to the anodes of said third and fourth rectifier means.

7. The multivibrator circuit of claim 5 comprising separate cathode follower means connected between the anodes of said first and second devices and said first and second capacitor means respectively.

8. The multivibrator circuit of claim 5 wherein said source of modulating signals comprises third and fourth electron discharge devices cascade-connected between said negative terminal and the cathodes of said first and second rectifier means in that order, means applying said signals to the control grid of said third device, and means connecting the control grid of said fourth device to a point of reference potential, whereby substantially all of the operating current of said third and fourth devices flows through said first and second rectifier means.

9. A variable frequency multivibrator circuit comprising first and second transistors each having an emitter, base and collector electrode, a source of operating potential having first and second terminals, separate impedance means connecting said collector electrodes to said second terminal, common direct current conducting impedance means connecting said emitter electrodes to said first terminal, first and second capacitor means, means connecting said first and second capacitor means between said collectors of said first and second transistors respectively and the bases of said second and first transistors respectively, a modulating signal source of high internal impedance, first and second rectifier means, means connecting said modulating signal source between said first terminal and like electrodes of said first and second rectifier means, and means connecting the remaining electrodes of said first and second rectifier means to the bases of said first and second transistors respectively, said first and second rectifier means being poled so that said rectifiers are alternately conductive for charging the capacitor means connected thereto by way of said modulating signal source.

10. A variable frequency multivibrator circuit comprising first and second transistors each having an emitter, base and collector electrode, a source of operating potential having first and second terminals, separate impedance means connecting said collector electrodes to said second terminal, common direct current conducting impedance means connecting said emitter electrodes to said first terminal, first and second capacitors, means connecting one electrode of said first and second capacitors to the collector electrodes of said first and second transistors respectively, means connecting the other electrode of said first and second capacitors to said second and first base electrodes respectively, first and second rectifier means, a high internal impedance source of modulating signals connected between said first terminal and like electrodes of said first and second rectifier means, and means connecting the other electrodes of said first and second rectifier means to the base electrodes of said first and second transistors respectively, said first and second rectifier means being poled so that they are alternately rendered conductive by multivibrator circuit voltages thereacross to alternately conduct charging current to said second and first capacitors respectively by way of said modulating signal source.

11. The multivibrator circuit of claim 10 in which said source of operating potential has a third terminal with a potential intermediate the potential of said first and second terminals, comprising third and fourth rectifier means connected between the base electrodes of said first and second transistors respectively and said third terminal, with unlike electrodes of said first and third rectifier means being interconnected and unlike electrodes of said second and fourth rectifier means being interconnected.

12. The multivibrator circuit of claim 10 in which said means connecting one electrode of said first and second capacitors to said collector electrodes of said first and second transistors respectively, comprises third and fourth transistors having a common emitter impedance connected to said first terminal, separate collector impedances connected to said second terminal, means connecting the base electrodes of said third and fourth transistors to the collector electrodes of said first and second transistors respectively, and means connecting the collector electrodes of said third and fourth transistors to said one electrode of said first and second capacitors respectively.

References Cited by the Examiner

UNITED STATES PATENTS

| | | | |
|---|---|---|---|
| 2,900,606 | 8/1959 | Faulkner | 307—88.5 |
| 3,077,567 | 2/1963 | Gray | 332—16 |
| 3,129,391 | 4/1964 | Kabell | 332—14 |

HERMAN KARL SAALBACH, *Primary Examiner.*

ALFRED L. BRODY, ROY LAKE, ELI LIEBERMAN, *Examiners.*